United States Patent [19]

Meneghini

[11] Patent Number: 5,553,388
[45] Date of Patent: Sep. 10, 1996

[54] DEVICE FOR MEASURING THE DISTANCE BETWEEN THE TOOL TIP AND THE SURFACE OF MATERIAL TO BE WORKED WITH AN ELECTRONIC PANTOGRAPH

[76] Inventor: Gianluigi Meneghini, Via Caravaggio, 6, Albignasego, Italy

[21] Appl. No.: 371,434

[22] Filed: Jan. 11, 1995

[30] Foreign Application Priority Data

Jan. 19, 1994 [IT] Italy ................... VE94A0001

[51] Int. Cl.⁶ .................. B43L 13/10; G01B 5/14
[52] U.S. Cl. ........................... 33/23.01; 33/832
[58] Field of Search ................ 33/1 M, 23.01, 33/503, 504, 555, 556, 558, 559, 561, 701, 710, 783, 832, 833, 838

[56] References Cited

U.S. PATENT DOCUMENTS 3,714,715  2/1973  Coes, Jr. .................... 33/556
3,781,999  1/1974  Colangelo .................. 33/838
4,593,473  6/1986  Shimomura ................ 33/832
5,131,166  7/1992  Weber ........................ 33/832

FOREIGN PATENT DOCUMENTS 56-82151  4/1981  Japan ........................ 33/555

Primary Examiner—William A. Cuchlinski, Jr.
Assistant Examiner—G. Bradley Bennett
Attorney, Agent, or Firm—Hoffman, Wasson & Gitler, P.C.

[57] ABSTRACT

A device for measuring the distance between the tip of a tool and the surface of the material to be worked in a rapid, accurate, and repeatable manner. The device includes, inter alia, an electronic pantograph, at least one sensor, an actuator controlled by the sensor, and a control unit which takes into account two distinct calculated distances.

9 Claims, 3 Drawing Sheets 5,553,388

DEVICE FOR MEASURING THE DISTANCE BETWEEN THE TOOL TIP AND THE SURFACE OF MATERIAL TO BE WORKED WITH AN ELECTRONIC PANTOGRAPH

FIELD OF THE INVENTION

This invention relates to a device for measuring the distance between the tool tip and the surface of material to be worked with an electronic pantograph.

BACKGROUND OF THE INVENTION

Known computerized pantograph are used in various sectors for engraving, cutting and scratching material such as jewellery articles, printing articles, stamps, nameplates etc.

These known pantographs generally comprise a tool movable in a horizontal plane and vertically raisable and lowerable under the control of an electronic unit, to make the incision in the material positioned on an underlying surface.

To make a constant-section incision the tool tip must penetrate a constant depth into the material, hence the distance between the tool tip and the surface of the material to be worked must be previously known with extreme precision to enable the control unit to then cause the tool to descend the required amount. Whereas on the one hand the distance between the arbor of the pantograph and the support surface for the material to be worked can be considered constant, the distance between the tool tip and the material surface varies both because of the shifting of the tool position as a result of tool replacement, the work carried out and wear, and because of variation in material thickness.

DESCRIPTION OF THE PRIOR ART

Various apparatus are currently used to measure the distance between the tool tip and surface of the material to be worked. In a first apparatus, of manual type, the tool tip is moved towards the material until it touches it. Contact between the tool tip and the material, or a thin paper sheet placed on the material, is noted visually and the moment of contact is sent to a control unit.

However this manual apparatus has certain drawbacks, and in particular:

- slowness of operation especially if a large number of objects are to be worked,
- a certain lack of precision due to visual observation of contact with the paper sheet.

In another so-called semiautomatic apparatus, the tool tip is moved towards the material with manually controlled movements until contact is indicated by electrical contact with the material surface, if the material is conductive, or with a suitable sensor positioned between the surface and the tip.

This known apparatus has however the following drawbacks:

- slowness of operation especially if a large number of objects are to be worked,
- poor precision if an electrical sensor is used, due to the size of the sensor base.

In a further so-called automatic apparatus, the movement of the tool tip towards the material takes place at a predetermined position, and movement is halted at the moment of contact with a suitable sensor, interposed between the tool tip and the material to be worked, which rests on the sensor.

This apparatus has however further drawbacks, and in particular:

- the possibility of damaging the material to be worked in the case of wrong positioning of the sensor or absence of the sensor,
- a slow operating speed because a whole series of operations has to be carried out, comprising positioning the sensor on the worked surface, moving the tip towards the sensor until contact is achieved, again raising the tool to remove the sensor, and finally the work itself.

SUMMARY OF THE INVENTION

An object of the invention is to obviate these drawbacks by providing a device for measuring the distance between the tool tip and the surface of the material to be worked which enables this measurement to be made rapidily and ensures method reliablity whether the sensor is present or not.

A further object of the invention is to measure the distance between the tool tip and the material surface in an accurate repeatable manner.

These and further objects are attained according to the invention through a device for measuring the distance between a tool tip and the surface of material to be worked with an electronic pantograph comprising an arbor provided with a tool, slidable vertically along a guide, and an element for vertically transporting the arbor, wherein the arbor is provided with a member movable, relative to said transporting element, between its two vertical end positions to achieve mutual sliding along a vertical axis, at least one sensor activated by the travel of the member along said transporting element when in a position different from the end positions, an actuator controlled by the sensor when activated to raise said member against the upper end-of-travel position, and a control unit which calculates the distance between the beginning of the descent of the transporting element and the point in which, following contact of the tool with the material, the member is raised until it faces the sensor, and which also calculates the distance through which said transporting element rises from the position in which the sensor is activated to the upper end-of-travel position, the distance to be measured being the sum of the two calculated distances.

BRIEF DESCRIPTION OF THE DRAWINGS

Three preferred embodiments of the present invention are described hereinafter with reference to the accompanying drawings, in which.

DESCRIPTION OF PREFERRED EMBODIMENTS

Figure 1:
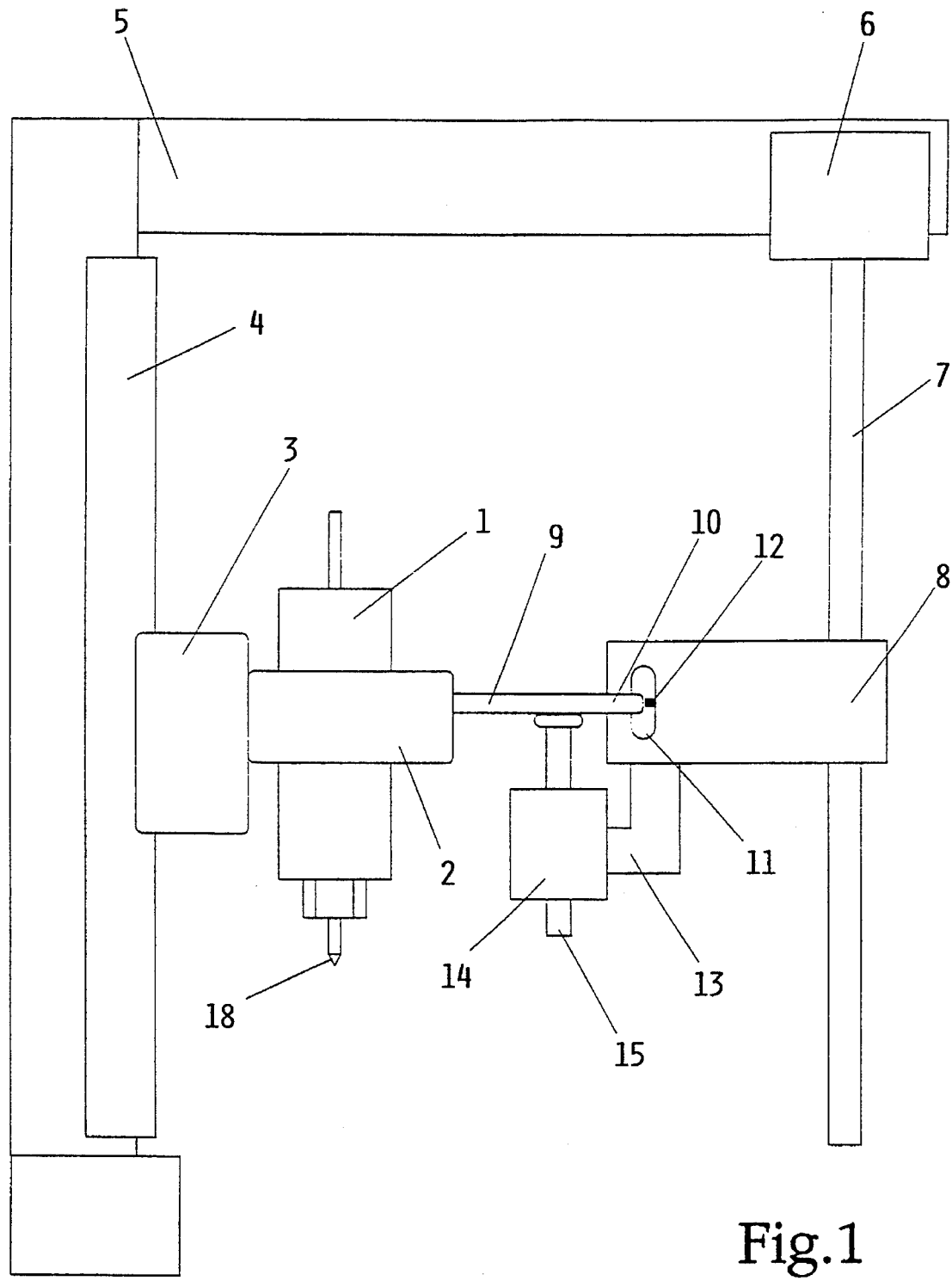
FIG. 1 is a schematic view of the measuring device applied to the arbor of an electronic pantograph.

As can be seen from the figures, the measuring device according to the invention is associated with an arbor 1 of an electronic pantograph (not shown on the drawings) controlled by a control unit. The arbor 1 is rigidly supported by, a support 2, with a shoe 3 slidable along a vertical guide 4 rigidly attached to a frame 5 movable in the horizontal plane. The frame 5 has a motor 6 the output shaft of, which is rigid with a worm 7 engaging in a corresponding lead-nut 8 of threaded or ball-circulation type.

The support 2 is provided with a pin 9, the end 10 of which engages in a vertical, slotted hole 11 provided in the lead-nut 8.

Within the vertical, slotted hole 11 there is mounted a position sensor 12 connected to the control unit to indicate the position of the pin 9 when it is in an intermediate position within the vertical slotted hole 11.

The lead-nut 8 also has a rigid bracket 13 extending from supporting an electromagnet 14 within which there is housed a piston 15 movable vertically under the control of the electromagnet 14.

The measuring device operates as follows.

Figure 2:
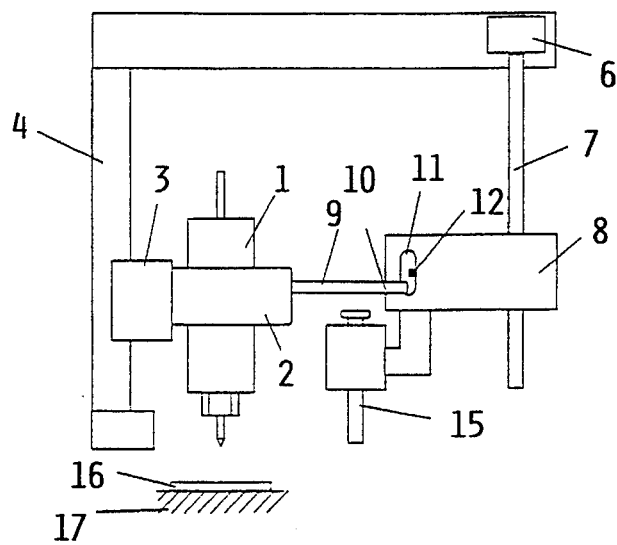
FIG. 2 shows the device during the descent stage.

When in the rest state (see FIG. 2) the lead-nut 8 is raised above the material 16 to be worked which rests on the operating surface 17. In this configuration the motor 6 is at rest and the unit comprising the support 2 and arbor 1 is positioned, due to its own weight, at the lower limit of the travel of the pin 9 along the slot 11. During this stage the arbor 1 is deactivated. The worm 7 is then rotated by the motor 6 to cause the lead-nut 8 and consequently the arbor 1 to descend. Again during this stage the pin 9 rests at the lower limit of the slot 11.

Figure 3:
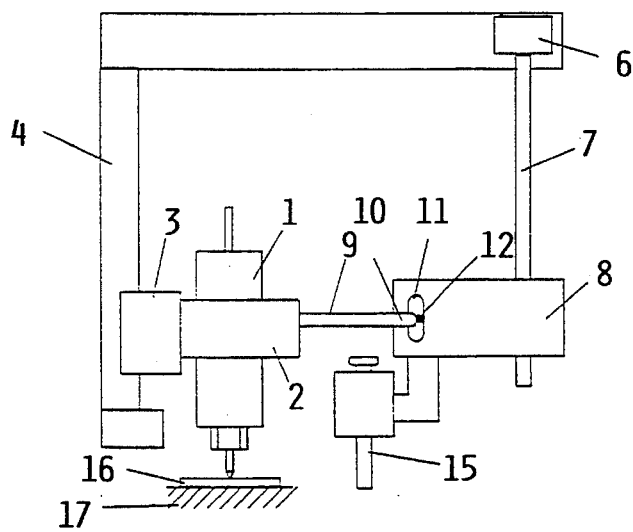
FIG. 3 shows it during the contact stage.

At the moment in which the tool tip 18 comes into contact with the surface of the material 16 (see FIG. 3), the arbor 1 halts its travel against said surface whereas the lead-nut 8 continues its descent. Consequently the pin 9 rises along the slot 11 until it activates the sensor 12 to stop the motor 6 and consequently halt the descent of the lead-nut 8. During this stage the distance travelled by the lead-nut from the commencement of its descent to the moment in which the sensor halts the rotation of the motor 6 is memorized by the control unit.

Figure 4:
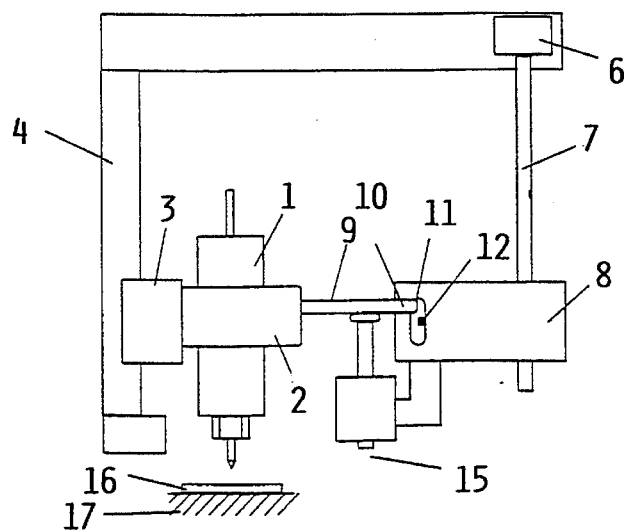
FIG. 4 shows it during the operating stage.

At the same time, the control unit, in response to the sensor 12, activates the electromagnet 14 which raises the piston 15 into its upper end-of-travel position. As a result of this movement the piston 15 raises the pin 9, and consequently the arbor 1 and the tool 18 connected to it, through a predetermined known distance (see FIG. 4). The sum of the previously measured distance and the distance through which the tip has risen caused by the emergence of the piston 15 corresponds to the measurement to be calculated, i.e., the distance between the tool tip 18 and the surface of the material 16 to be worked. This measurement is memorized by the control unit.

On termination of the raising stage, the motor of the arbor 1 can be rotated and the material is worked in accordance with the desired program. For this, the motor 6 is rotated so that the worm 7 causes the lead-nut 8 to descend such that the tool tip 18 firstly makes contact with the surface of the material 16 to be worked and then commences the incision action to a predetermined depth. During this incision action, the pressure exerted by the tool on the material is transferred by the pin 9 to the highest point of the slot 11.

From the aforegoing it is clear that the measuring device of the invention has numerous adavantages and in particular:

it enables the distance to be measured quickly because the measurement is made completely automatically, the incision stage commencing as soon as this distance has been measured, hence representing an "in-line" operation, it presents measurement accuracy and repeatability, in that the effective measurement is calculated on the basis of the advancement undergone by the lead-nut 8 towards the material 16, with precision identical to that with which the work will be carried out, there being nothing interposed between the tip 18 and the material 16, it does not damage the material 16 during the measurement stage because this operation is carried out on a programmable point controlled by the control unit: the measurement is normally made by bringing the tool tip 18 into contact with the material 16 at the first point on the work 16, so that any possible scratching caused during the measurement stage is "cancelled" by the work effected over it, it does not damage the material 16 because the weight of the support 2 plus arbor 1 plus shoe 3 plus tip 18 is "small" relative to the structure, it also enables irregular or partially worked material 16 to be measured in that the distance from the tip 18 is measured in regions which have still to be worked and which could be of minimum dimensions, the sensor-magnet unit has a light structure because, as stated, the working pressure is exerted against a solid structure formed by the lead-nut 8 plus worm 7 plus motor 6.

Figure 5:
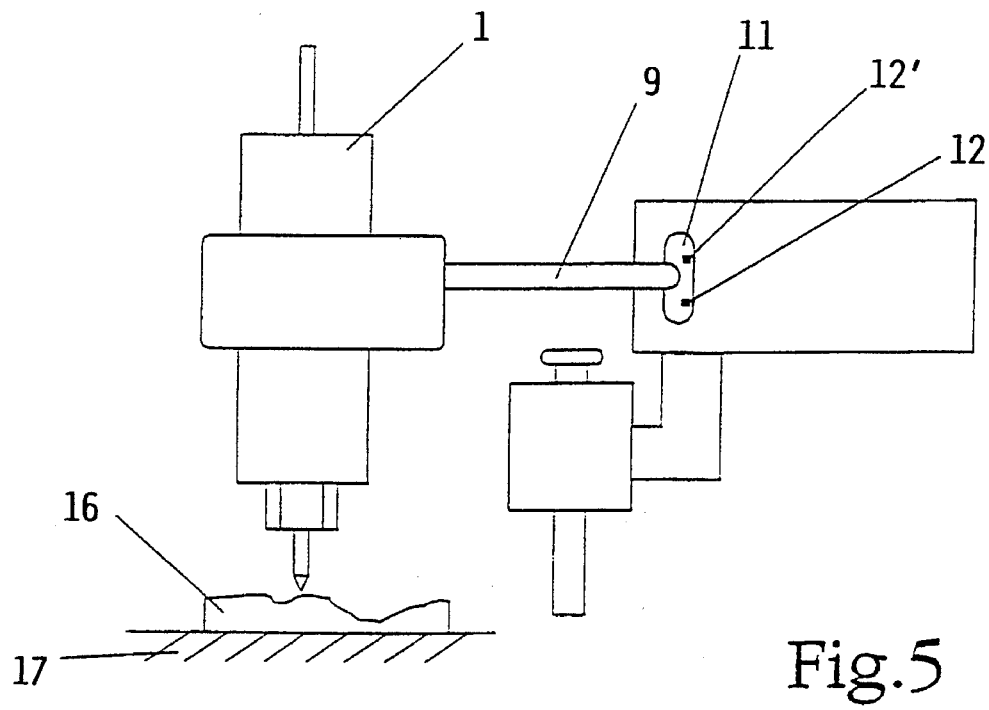
FIG. 5 shows a modified embodiment during the contact stage.

In the embodiment shown in FIG. 5, within the slotted hole 11 of the lead-nut 8 there are provided two sensors 12,12'. This embodiment is advantageously useful if it is required to measure the variation in the worked surface about a predetermined point on materials having a certain irregularity.

In the operation of this embodiment of the apparatus, during the measurement stage, once the tip 18 has made contact with the surface 16 to be worked, the sensor 12 measures the distance of this first point of contact. The purpose of this sensor 12 and of the other sensor 12' is to automatically adjust the position of the lead-nut relative to the positions which the pin 9 assumes during the advancement of the tip over the material to be worked.

Consequently when the pin 9 faces the sensor 12 the motor 6 rotates in the direction of causing the lead-nut 8 to descend, whereas when the pin 9 faces the sensor 12' the motor 6 rotates in the direction causing the lead-nut 8 to rise.

Consequently if the two sensors 12,12' are close together a correspondence is obtained between the level difference encountered by the tool tip 18 in its advancement along the material 16, the ocillations undergone by the lead-nut 8 being measured by the control unit and memorized.

Having completed the measurement path, it is worked with the tip 18 rotating to execute those movements which are memorized during the previous stage. This embodiment has the further advantage that the distance measurement is made precisely on the working points, so that there is no scratching or cutting on parts external to the effective incision.

Figure 6:
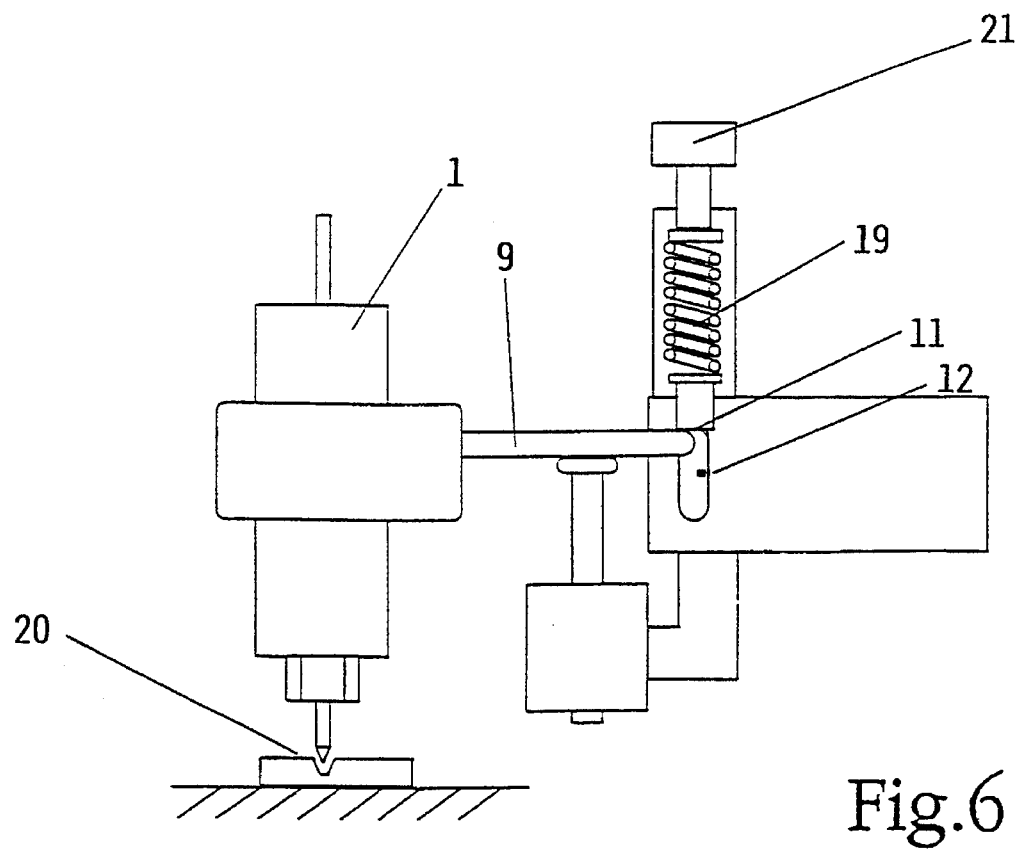
FIG. 6 shows a further modified embodiment during the operating stage.

In the embodiment shown in FIG. 6 the upper travel stop of the slot 11 consists of a counteracting coil spring 19. In this configuration, during working, the working pressure is transferred to the spring to cause it to compress. Consequently the magnet 14 maintains the pin 9 resting against said spring until the working pressure exceeds the elastic constant of the spring. When this pressure exceed this force, the tip 18 and consequently the pin 9 rigid with it rise to rebalance the spring force, hence separating from the piston 15. In this manner it is possible to work using a predetermined pressure corresponding to the maximum pressure which can be applied to that particular material. This pressure can be set by operating an adjustment device 21.

I claim:

1. A device for measuring a distance between a tool tip and a surface of material to be worked comprising:

an arbor slidable vertically along a guide and provided with a tool, a transporting element for vertically moving said arbor, wherein said arbor has a member movable relative to said transporting element between two vertical end positions to achieve mutual sliding along a vertical axis, at least one sensor activated by travel of said member along said transporting element when in a position different from said two vertical end positions, an actuator controlled by said at least one sensor, when activated to raise said member against an upper end-of-travel position, and a control unit which calculates a first distance between a beginning of descent of said transporting element and a point in which, following contact with said tool tip with said material to be worked, said member is raised until stopped and due to said descent of said transporting element said member faces said sensor, and which also calculates a second distance through which said transporting element rises from said position in which said sensor is activated to said upper end-of-travel position, a distance to be measured being a sum of said first and said second calculated distances.

2. A device as claimed in claim 1, wherein said arbor is held by a support provided with a shoe slidably engaged to said vertical guide.

3. A device as claimed in claim 1, wherein said transporting element consists of a threaded lead-nut engaged by a worm driven by a motor.

4. A device as claimed in claim 3, wherein said engagement member consists of a pin which engages in a corresponding vertical slotted hole provided in said lead-nut.

5. A device as claimed in claim 1, wherein within said vertical slotted hole there is mounted a position sensor which indicates a position of said pin when said pin is in an intermediate position within said slotted hole.

6. A device as claimed in claim 1, wherein said activator consists of an electromagnet mounted on a bracket rigid with said lead-nut, within said electromagnet there being housed a piston which moves vertically under control of said electromagnet following activation of said sensor.

7. A device as claimed in claim 3, wherein said at least one sensor comprises two sensors, activation of which causes said motor to rotate in one of two directions, with corresponding raising and lowering of said threaded lead-nut.

8. A device as claimed in claim 1, wherein said upper end-of-travel position of said slot has a counteracting coil spring.

9. A device as claimed in claim 8, wherein pressure of said counteracting spring is adjustable by an adjustment device.

* * * * *